(12) United States Patent
Pedersen

(10) Patent No.: US 7,394,768 B2
(45) Date of Patent: Jul. 1, 2008

(54) FAIR SCHEDULING WITH GUARANTEED MINIMUM PARAMETER

(75) Inventor: Klaus Ingemann Pedersen, Aalborg (DK)

(73) Assignee: Nokia Corporation, Espoo (FI)

( * ) Notice: Subject to any disclaimer, the term of this patent is extended or adjusted under 35 U.S.C. 154(b) by 904 days.

(21) Appl. No.: 10/608,158

(22) Filed: Jun. 30, 2003

(65) Prior Publication Data
US 2004/0218545 A1 Nov. 4, 2004

(30) Foreign Application Priority Data
Apr. 30, 2003 (EP) ................... 03009923

(51) Int. Cl.
*H04L 12/26* (2006.01)
*H04L 12/28* (2006.01)
*H04B 7/212* (2006.01)

(52) U.S. Cl. .................. 370/252; 370/395.4; 370/444

(58) Field of Classification Search ......... 370/229–234, 370/252–255, 395.4, 395.41, 395.42, 345–348, 370/442–444, 458–462, 468
See application file for complete search history.

(56) References Cited

U.S. PATENT DOCUMENTS

| | | | | |
|---|---|---|---|---|
| 6,337,860 | B1 * | 1/2002 | Wicklund | 370/387 |
| 6,788,687 | B2 * | 9/2004 | Bao et al. | 370/394 |
| 6,807,426 | B2 * | 10/2004 | Pankaj | 455/453 |
| 6,847,809 | B2 * | 1/2005 | Gurelli et al. | 455/226.3 |
| 6,917,812 | B2 * | 7/2005 | Damnjanovic | 455/452.2 |
| 2002/0183066 | A1 | 12/2002 | Pankaj | |
| 2003/0012220 | A1 * | 1/2003 | Kim et al. | 370/455 |
| 2003/0039213 | A1 | 2/2003 | Holtzman | |
| 2003/0067935 | A1 | 4/2003 | Hosein | |
| 2003/0081627 | A1 * | 5/2003 | Bao et al. | 370/444 |
| 2003/0101274 | A1 * | 5/2003 | Yi et al. | 709/232 |
| 2003/0147371 | A1 * | 8/2003 | Choi et al. | 370/341 |
| 2004/0187069 | A1 * | 9/2004 | Pietraski et al. | 714/786 |

OTHER PUBLICATIONS

Kuenyoung Kim, et al. (School of Cummunication Engineering, Information and Communications University, Korea), "A Proportionally Fair Scheduling Algorithm With QOS and Priority in 1XEV-DO", 2002, pp. 2239-2243.

* cited by examiner

*Primary Examiner*—Wing Chan
*Assistant Examiner*—Hong Sol Cho
(74) *Attorney, Agent, or Firm*—Squire, Sanders & Dempsey, L.L.P.

(57) ABSTRACT

The present invention relates to a scheduling method and apparatus for scheduling data packets in time-shared channels, wherein a scheduling priority is determined for a user based on a ratio between a transmission parameter, e.g. throughput, offered to the user and an average preceding value ($T_n$) of the transmission parameter provided to the user within a predetermined time period. The determined scheduling priority is changed in dependence on a difference between the average preceding value and a minimum average value allocated to the user, e.g. by using a mapping function for generating a mapped value ($H_n$) replacing the average preceding value ($T_n$). Thereby, the minimum average value allocated to the user can be guaranteed by increasing the scheduling priority when the monitored average preceding value converges to the minimum average value.

15 Claims, 3 Drawing Sheets

FAIR SCHEDULING WITH GUARANTEED MINIMUM PARAMETER

FIELD OF THE INVENTION

The present invention relates to a scheduling method and apparatus for scheduling data packets in time-shared channels of e.g. wireless networks.

BACKGROUND OF THE INVENTION

To satisfy increasing demands for high-speed packet data, emerging standards for next-generation DS-CDMA (Direct Sequence Code Division Multiple Access) systems are currently extended to cope with higher data rates. Both suggested High Data Rate (HDR) and High Speed Downlink Packet Access (HSDPA) modes consider a time-divided downlink. One key issue for better utilization of scarce radio resources is an appropriate scheduling of users in order to enhance the throughput. Hence, rate control and time-division scheduling algorithms are used in forwarding packet data transmission to utilize the radio resource effectively and support the high transmission rate.

Employing an efficient packet scheduling algorithm is an essential technique in order to improve the total system throughput as well as the peak throughput of each access user. Although always scheduling the user with the highest link quality may maximise capacity, it can result in a performance too unfair among the users. In the RR (Round Robin) method, the packet transmission opportunities are equally assigned to all communicating users within a sector irrespective of the radio link conditions of each user. However, the total system throughput with this RR scheduler becomes much lower than with other scheduling methods. So far, efficient packet scheduling algorithms have been proposed that assign a slot to the access users within a cell based on the radio link conditions which an access user notifies to the base station. A good scheduling algorithm may guarantee the fairness or the QoS of each service while considering the time-varying channel conditions of each user.

Such fairness issues have been studied for many type of systems, not only wireless. For example, in "Asymptotic analysis of proportional fair algorithm" by J. M. Holtzman, Proc. IEEE PIMRIC, vol. 2, pp. 33-37, 2001, the purpose was to schedule the users to get access to the channel the same asymptotical fraction of time but taking advantage of instantaneous channel variations. According to this asymptotical analysis of scheduling, fairness accounts for providing certain channel access time fractions among the users. That is, equal expected throughput is not necessarily guaranteed, rather the access to the channel.

The proportional fair scheduling method assigns transmission packets based on criteria such as a ratio between an instantaneous signal-to-interference power ratio (SIR) and a long-term average SIR value of each user. Another well-known proportional fair scheduling algorithm is the so-called proportional fair throughput (PFT) algorithm which provides a trade-off between throughput maximisation and fairness among users within a cell. In the traditional framework, the PFT algorithm selects the user to be scheduled during the next transmission time interval (TTI) according to a priority metric, which can be expressed as:

$$P_n = R_n / T_n$$

for a user numbered n, where $R_n$ denotes the throughput which can be offered to user n during the next TTI where this user is scheduled, and $T_n$ denotes the mean or average throughput delivered to this user within a predetermined time period. It is noted that the value $R_n$ is typically time-variant as it depends on the SIR value of this user. The priority metric $P_n$ is calculated for all users sharing the time-multiplexed channel, e.g. the Downlink Shared Channel (DSCH) or the High Speed Downlink Shared Channel (HS-DSCH) as described in the 3 GPP (third generation Partnership Project) specification TS 25.308 V5.4.0.

The user with the largest calculated or determined priority metric is selected to be scheduled during the next TTI. Hence, if the user n has not been scheduled for a long period of time, the monitored average throughput $T_n$ will decrease and consequently cause an increase of the priority $P_n$ of said user.

However, so far, the PFT algorithm does not include any mechanism which helps to guarantee a minimum average throughput to a single user in the system. The same applies to other proportional fair scheduling schemes based on other transmission parameters.

SUMMARY OF THE INVENTION

It is therefore an object of the present invention to provide an improved fair scheduling mechanism, by means of which a minimum value of a scheduling parameter can be guaranteed to each of the system users.

This object is achieved by a scheduling method of scheduling data packets in time-shared channels, said method comprising the steps of:
  determining a scheduling priority for a user based on a ratio between a transmission parameter offered to said user and an average preceding value of said transmission parameter provided to said user within a predetermined time period; and
  changing said determined scheduling priority in dependence on a difference between said average preceding value and a minimum average value allocated to said user.

Furthermore, the above object is achieved by a scheduling apparatus for scheduling data packets in time-shared channels, said apparatus comprising:
  priority determination means for determining a scheduling priority for a user based on a ratio between a transmission parameter offered to said user and an average preceding value of said transmission parameter provided to said user within a predetermined time period; and
  priority change means for changing said determined scheduling priority independence on a difference between said average preceding value and a minimum average value allocated to said user.

Accordingly, when the monitored average parameter value decreases and converges to the minimum guaranteed parameter value, the scheduling priority of the specific user is increased to thereby increase the scheduling probability for this user. Users with low monitored average throughput are thus prioritized so as to guarantee their allocated minimum average value. Thereby, an attractive scheduling mechanism is presented, which partly aims at maximizing the transmission parameter of the concerned cell by monitoring the instantaneous possible value of the transmission parameter to all users, while still providing a minimum fairness among the users specified by their minimum guaranteed average values.

The priority changing step may comprise the step of using a mapping function for mapping the average preceding value to a reduced value based on a difference between the average preceding value and the allocated minimum average value. In particular, the mapping function may be adapted to provide the reduced value if the average preceding value falls below a predetermined value higher than the allocated minimum average value. By means of the proposed mapping function, a desired system behaviour can be selected, which describes the system when the average value of the transmission parameter converges to the guaranteed minimum average value. The selection of the predetermined value determines a threshold for the start of the proposed priority increase for a specific user.

The mapping function may be adapted to set said reduced value to zero if the average preceding value is less or equal the allocated minimum average value. In this case, the priority of the concerned user reaches infinity as soon as the average value of the transmission parameter has reached the minimum average value. This assures, that the data packets of the concerned user will be scheduled in the next TTI, provided that the total channel capacity is high enough.

The mapping function may be a piecewise linear function, the piecewise linear function may provide a one-to-one mapping if the average value is greater or equal the predetermined value, and a linear decreasing mapping if the average value is less than the predetermined value but greater or equal the allocated minimum average value. Such a mapping function ensures that no priority change is obtained for average values above the predetermined value. However, when the monitored average value has reached and falls below the predetermined value, the priority will continuously increase with falling average value, to provide a continuously increasing scheduling priority for the concerned user.

If there are users for which the same scheduling priority has been determined, these users may be served in a random order, e.g. according to the RR or another suitable random scheduling mechanism. This assures that the proposed mechanism will still continue to serve the users according to their priority metric, even if the total capacity of the shared channel is too small to fulfil the minimum requirements for all users. This feature is useful especially in those cases where the priority is set to infinity when the monitored average value of the transmission parameter has reached or falls below the guaranteed minimum value.

The transmission parameter may be the throughput of the channel allocated to said user. Of course, the proposed invention can be used in connection with other transmission parameters, e.g. SIR value, suitable for fair scheduling mechanisms.

Furthermore, disabling means may be provided for disabling the proposed priority change mechanism so as to provide the conventional fair scheduling mechanism without guaranteed minimum average transmission parameter. This disabling function may be based on switching means for bypassing the corresponding priority change means.

Further advantageous modifications are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

The preferred embodiments will now be described based on a Medium Access Control (MAC) architecture for a Node B device of a UMTS Terrestrial Radio Access Network (UTRAN), as described for example in the 3GPPP specification TS 25.308.

HSDPA is based on techniques such as adaptive modulation and Hybrid Automatic Repeat Request (HARQ) to achieve high throughput, reduced delay and high peak rates. It relies on a new type of transport channel, i.e. the High Speed Downlink Shared Channel (HS-DSCH), which is terminated in the Node B. The Node B is the UMTS equivalent to base station in other cellular networks.

The new functionalities of HARQ and HS-DSCH scheduling are included in the MAC layer. In the UTRAN, these functions are included in a new entity called MAC-hs 10 located in the Node B and schematically depicted in FIG. 1.

The transport channel HS-DSCH is controlled by the MAC-hs 10. For each TTI of the HS-DSCH, each shared control channel (HS-SCCH) carries HS-DSCH related downlink signalling for one user equipment (UE) which is the UMTS equivalent to the mobile station or mobile terminal in other cellular networks. Data received on the HS-DSCH is mapped to the MAC-hs 10. The MAC-hs 10 is configured by a Radio Resource Control (RRC) function to set the parameters according to the allowed transport format combinations for the HS-DSCH. Associated downlink signalling (ADS), e.g. associated Dedicated Physical Channel (DPCH), carries information for supporting the HS-DSCH and associated uplink signalling (AUS) carries feedback information. As to the AUS, it may be distinguished between the associated DPCH and the HS-DPCCH (High Speed Dedicated Physical Control Channel) which is the channel carrying the acknowledgements for packet data units (PDUs) received on the HS-DSCH. If a HS-DSCH is assigned to the concerned UE, PDUs to be transmitted are transferred to the MAC-hs 10 via respective Iu interfaces to provide the required scheduling function for the common HS-DSCH.

The MAC-hs 10 is responsible for handling the data transmitted on the HS-DSCH. Furthermore, it is responsible for the management of physical resources allocated to the HS-DSCH. To achieve this, the MAC-hs 10 receives configuration parameters via messages of the Node B Application Part (NBAP).

Figure 1:
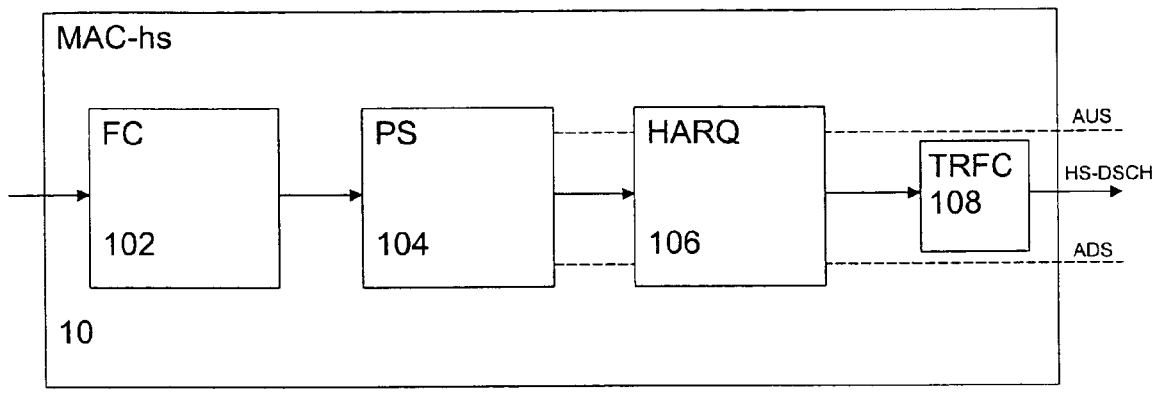
FIG. 1 shows a schematic functional block diagram of a MAC-hs unit with a packet scheduler in which the preferred embodiments can be implemented.

According to FIG. 1, the MAC-hs 10 comprises four different functional entities. A flow control unit 102 provides a flow control function intended to limit layer 2 signalling latency and reduce discarded and transmitted data as a result of HS-DSCH congestion. Flow control is provided independently per priority class for each MAC flow. Furthermore, a packet scheduling unit 104 is provided which manages HS-DSCH resources between HARQ entities and data flows according to their priority class. Based on status reports from associated uplink signalling, e.g. HS-DPCCH signalling, either new transmission or retransmission is determined. signalling, either new transmission or retransmission is determined. Further, the priority class identifiers and transmission sequence numbers are set for each new data block being served. To maintain proper transmission priority, a new transmission can be initiated on a HARQ process at any time. The transmission sequence number is unique to each priority class within a HS-DSCH, and is incremented for each new data block. It is not permitted to schedule new transmissions within the same TTI, along with retransmission originating from the HARQ layer.

A subsequent HARQ unit 106 comprises HARQ entities, wherein each HARQ entity handles the HARQ functionality for one user. One HARQ entity is capable of supporting multiple instances of stop and wait HARQ protocols. In particular, one HARQ process may be provided per TTI.

Finally, a Transport Format Resource Combination (TFRC) selection unit 108 is provided for selecting an appropriate transport format and resource combination for the data to be transmitted on the HS-DSCH.

In the following, the scheduling mechanism in the packet scheduling unit 104 is described in greater detail.

Figure 2:
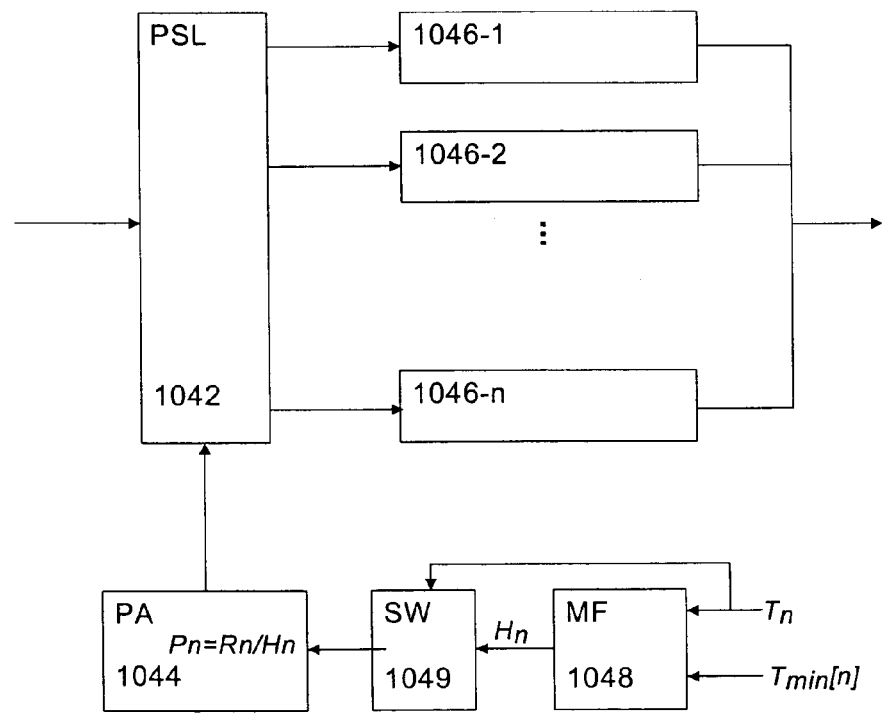
FIG. 2 a schematic functional block diagram of a packet scheduling unit according to the preferred embodiments.

FIG. 2 shows a schematic functional block diagram of the scheduling functionality. Data packets to be scheduled are supplied to a priority selection function 1042 which selects a priority class for each data packed based on a priority information $P_n$ obtained from a priority allocation function 1044 for the concerned user n.

According to the preferred embodiments, the initially described PFT algorithm is modified to change the allocated priority information $P_n$ in dependence on the difference between the monitored average throughput $T_n$ of the concerned user n and the guaranteed minimum average throughput $T_{min}[n]$. In particular, the priority information $P_n$ is generated by the priority allocation function 1044 in such a manner that it is increased when the monitored average throughput $T_n$ converges to the guaranteed minimum average throughput $T_{min}[n]$. This can be achieved by providing a mapping unit 1048 to which the monitored average throughput $T_n$ and the guaranteed minimum average throughput $T_{min}[n]$ are supplied, e.g. from respective determination functions (not shown) provided at the MAC-hs 10, and which generates a modified value $H_n$ replacing the monitored average throughput $T_n$ in the priority calculation according to the PFT algorithm.

Hence, the initially expressed priority metric is now modified and can be expressed as:

$$P_n = R_n/H_n$$

where $H_n = f(T_n; T_{min}[n])$ is a mapping function of the monitored average throughput $T_n$ conditioned on the guaranteed minimum average throughput $T_{min}[n]$ for the user n. The mapping function can be selected or adapted to obtain a desired priority changing behaviour when the monitored average throughput $T_n$ converges to the guaranteed minimum average throughput $T_{min}[n]$.

Optionally, a switching function 1049 may be provided for directly switching the monitored average throughput $T_n$ to the input of the priority allocation function 1044 which calculates the priority information $P_n$ based on the above modified priority metric. The switching function 1049 thus can be used to bypass the mapping function so as to provide a scheduling function according to the conventional PFT algorithm, i.e. $H_n = T_n$.

The priority selection function 1042 is arranged to select one of a plurality of priority buffers 1046-1 to 1046-n to which respective priority clsses are allocated. Data packets supplied to the same priority buffer have the same allocated priority class which is determined based on the priority information $P_n$ supplied from the priority allocation function 1044. Thus, the priority selection function 1042 selects the priority buffer based on the priority information $P_n$ received from the priority allocation function 1044. If more than one data packet is stored or queued in one of the priority buffers 1046-1 to 1046-n at the same TTI, these data packets are scheduled in a random order, e.g. according to an RR algorithm. In FIG. 2, the upper priority buffer 1046-1 may store data packets with the highest priority class, while the lowest buffer 1046-n may store data packets with the lowest priority class. As long as a buffer with a higher priority class stores a data packet, data packets in priority buffers of lower priority classes are not forwarded towards the common HS-DSCH.

Figure 3:
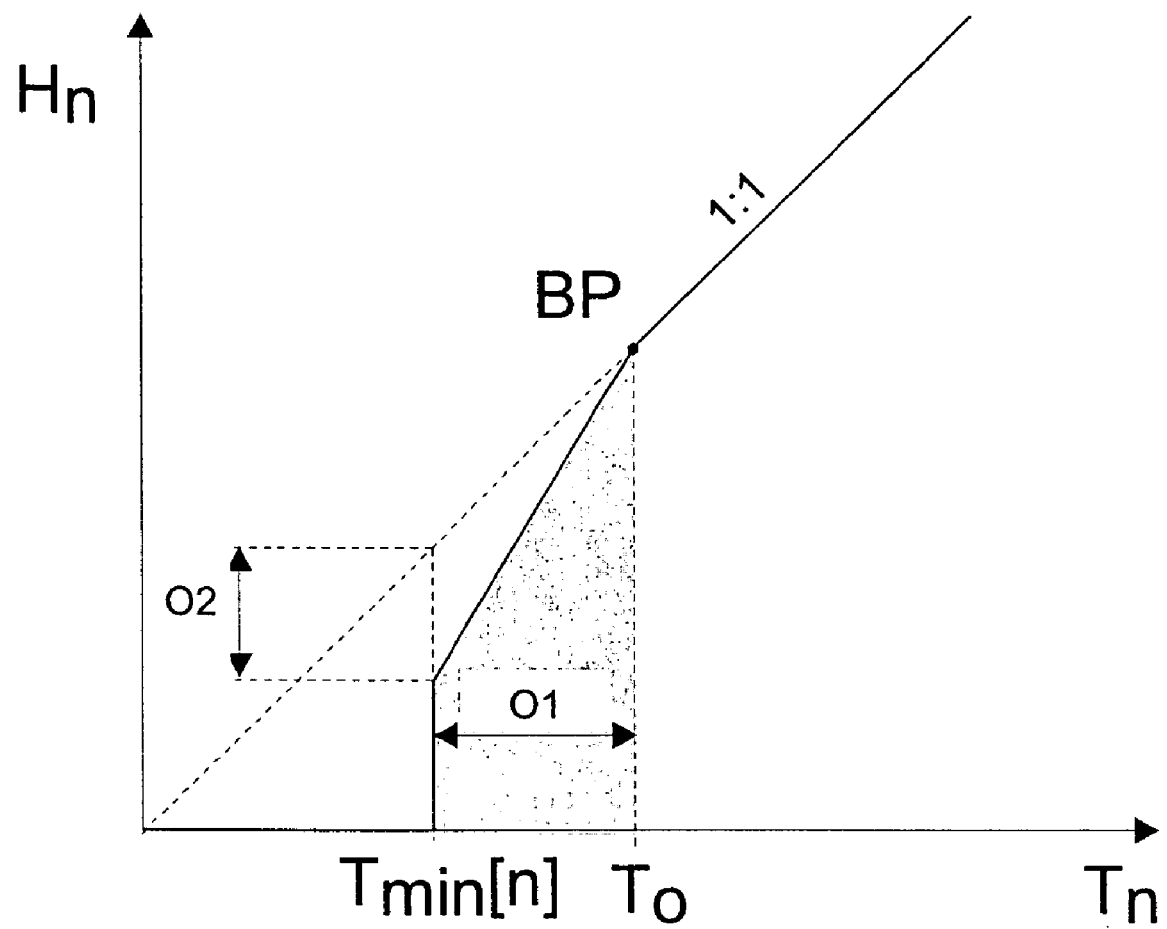
FIG. 3 shows a mapping function used for priority changing according to the first preferred embodiment.

FIG. 3 shows a schematic diagram indicating an example of a mapping function $H_n = f(T_n; T_{min}[n])$ according to the first preferred embodiment.

As can be gathered from FIG. 3, the mapping function according to the first preferred embodiment is a piecewise linear function which provides a one-to-one mapping, i.e. $H_n = T_n$, until the monitored average throughput $T_n$ has decreased to a mapping threshold $T_o$ defining a break point BP of the mapping function. The mapping threshold $T_o$ is located at a throughput value larger than the guaranteed minimum average throughput $T_{min}[n]$ by a first offset value O1. During the throughput range between the mapping threshold $T_o$ and the guaranteed minimum average throughput $T_{min}[n]$ the slope of the mapping function is increased to provide a linear decreasing mapping until the mapped or reduced throughput value $H_n$ has reached a value of the guaranteed minimum average throughput $T_{min}[n]$, which is lower than the one-to-one mapping value by a second offset value O2. Below the guaranteed minimum average throughput value $T_{min}[n]$, the mapped throughput value $H_n$ is forced to zero, so that the priority allocation function 1044 will calculate a maximum priority information indicating that the priority equals infinity.

The mapping function depicted in FIG. 1 can be described by the following expressions:

For $T_n > T_{min}[n] + O1$: $H_n = T_n$

For $T_n < T_{min}[n] + O1$: $H_n < T_n$

For $T_n < T_{min}[n]$: $H_n = 0$

Hence, once the monitored average throughput $T_n$ starts to converge to the guaranteed minimum average throughput $T_{min}[n]$, the priority metric of the user n is increased by selecting $H_n < T_n$. This is indicated in FIG. 1 by the shaded area, where the priority of users getting close to their guaranteed minimum average throughput $T_{min}[n]$ is increased. Below the guaranteed minimum average value $T_{min}[n]$, the priority metric of the user n is increased to infinity due to the zero value of $H_n$, i.e. the user will be scheduled during the following TTI.

Although the mapping function depicted in FIG. 3 is a piecewise linear function, other functions can be used as well, provided that the function fulfils the criteria $H_n < T_n$ when the monitored average throughput $T_n$ starts to converge to the guaranteed minimum average throughput $T_{min}[n]$.

In cases where the total capacity of the shared channel, e.g. HS-DSCH or HSDPA, is too small to fulfil the guaranteed minimum requirements for all users, the proposed algorithm will still continue to serve the users according to their priority metric. If the mapping function according to the first predetermined embodiment is used during a congestion phase, where the minimum guaranteed throughput requirements cannot be met, all users will have a monitored average throughput $T_n$ which is below the guaranteed minimum average throughput $T_{min}[n]$. Hence, the priority metric for all users will converge towards infinity. In these cases, the same maximum priority class will be allocated to all data packets and the packet scheduling unit 104 will serve the multiple users with the same priority class in random order, i.e. according to an RR algorithm, as already mentioned above. This basically means that the proposed modified PFT algorithm will be reduced to a standard RR algorithm when the mapping function depicted in FIG. 3 is applied and the shared channel is congested.

Figure 4:
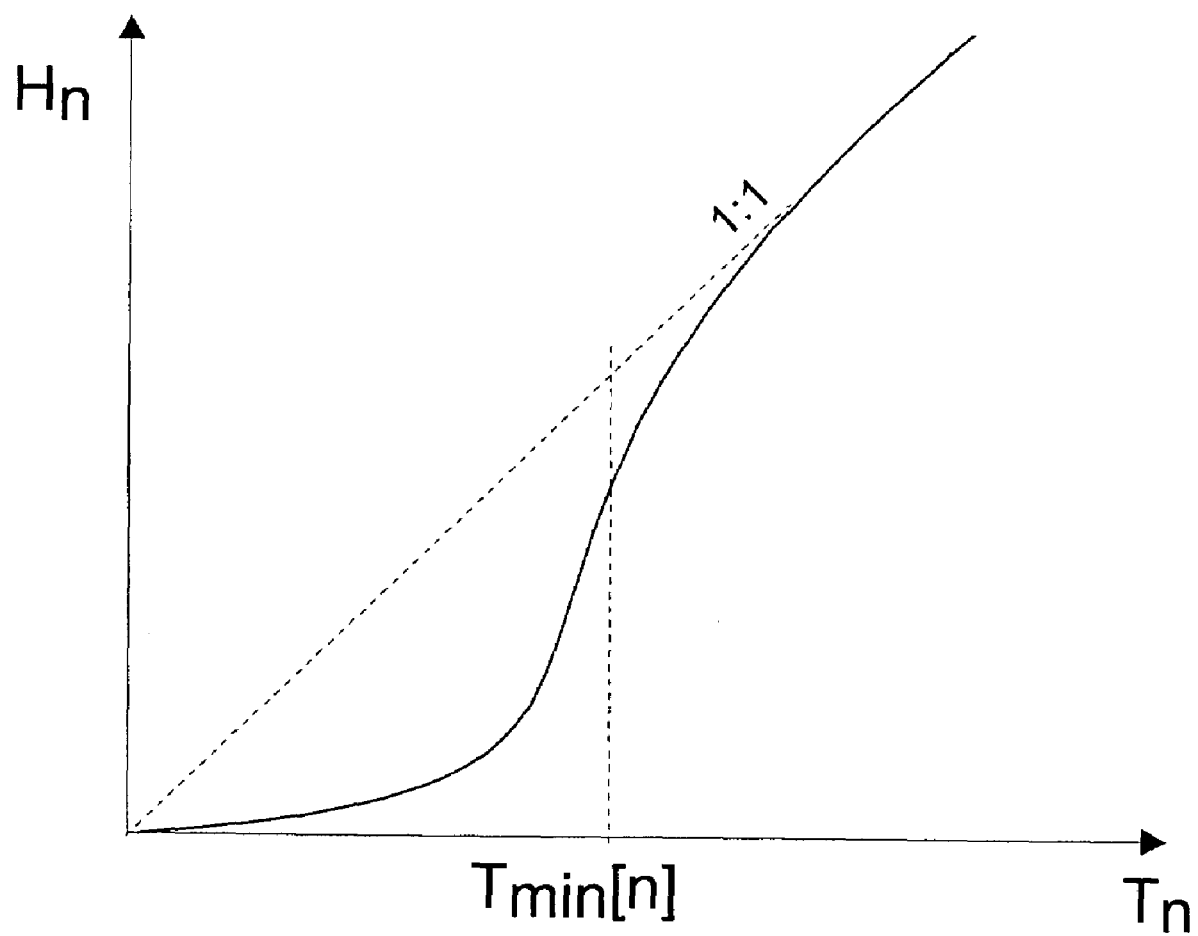
FIG. 4 shows an alternative mapping function for priority changing according to a second preferred embodiment.

FIG. 4 shows an alternative non-linear mapping function according to the second preferred embodiment.

Here, the mapped average throughput $H_n$ is not reduced to zero below the guaranteed minimum average throughput $T_{min}[n]$, so that the priority metric does not converge to infinity once the monitored average throughput becomes lower than the guaranteed minimum average throughput $T_{min}[n]$. This mapping function provides a scheduling property where, during a congestion when the guaranteed minimum average throughput $T_{min}[n]$ cannot be provided, the user with the maximum difference between the guaranteed minimum average throughput $T_{min}[n]$ and the monitored average throughput $T_n$, i.e. $\max\{T_{min}[n]-T_n\}$, is scheduled with a higher probability. Hence, using the mapping function according to the second preferred embodiment, as depicted in FIG. 2, a conversion to the RR scheduling algorithm can be prevented during congestion.

The mapping functions according to the first and second embodiments can be implemented at the mapping unit 1048 e.g. based on a lookup table storing mapped values $H_n$ according to the mapping function and being addressed by the corresponding current values of the monitored average throughput $T_n$ and the guaranteed minimum average throughput $T_{min}[n]$. As an alternative, a processing functionality may be provided at the mapping unit 1048 for calculating the mapped value $H_n$ based on a processing scheme or processing program by which the mapping function is implemented and to which the corresponding current values of the monitored average throughput $T_n$ and the guaranteed minimum average throughput $T_{min}[n]$ are supplied as input values.

The modified fair scheduling mechanism according to the present invention ensures that the guaranteed minimum throughput requirements can be fulfilled for scheduled users on shared channels. By proper selection of the mapping function, the behaviour of the scheduling mechanism during congestion, i.e. in cases where the guaranteed minimum throughput requirements can no longer be fulfilled, can also be efficiently controlled.

It is noted that the present invention is not restricted to the above specific scheduling mechanism based on the throughput as transmission parameter. The present invention can be applied to any scheduling mechanism based on any other suitable transmission parameter, such as SIR values or delay values or the like. Moreover, the present invention can be applied to any DSCH or HSDPA scheduling algorithm or other scheduling algorithms in all kinds of data packet connections. The preferred embodiments may thus vary within the scope of the attached claims.

The invention claimed is:

1. A method comprising:
   scheduling data packets in time-shared channels by determining a scheduling priority for a user based on a ratio between a transmission parameter offered to said user and an average preceding value of said transmission parameter provided to said user within a predetermined time period; and
   changing said determined scheduling priority in dependence on a difference between said average preceding value and a minimum average value allocated to said user,
   wherein said changing comprises using a mapping function to map said average preceding value to a reduced value based on said difference between said average preceding value and said allocated minimum average value.

2. A method according to claim 1, wherein said mapping function is configured to provide said reduced value if said average preceding value falls below a predetermined value higher than said allocated minimum average value.

3. A method according to claim 2, wherein said mapping function is a piecewise linear function.

4. A method according to claim 3, wherein said piecewise linear function provides a one-to-one mapping if said average preceding value is greater than or equal to said predetermined value, and a linear decreasing mapping if said average value is less than said predetermined value but greater than of equal to said allocated minimum average value.

5. A method according to claim 1, wherein said mapping function is configured to set said reduced value to zero if said average preceding value is less than or equal to said allocated minimum average value.

6. A method according to claim 1, wherein users for which the same scheduling priority has been determined in said determination step are served in a random order.

7. A method according to claim 1, wherein said scheduling method is used for downlink shared channel packet scheduling in a radio access network.

8. A method according to claim 1, wherein said scheduling method is used for high speed downlink packet access packet scheduling in a MAC-hs unit of a Node B device.

9. A method according to claim 1, wherein said transmission parameter is a throughput of a channel allocated to said user.

10. An apparatus comprising:
    priority determination unit configured to determine a scheduling priority for a user based on a ratio between a transmission parameter offered to said user and an average preceding value of said transmission parameter provided to said user within a predetermined time period; and
    priority change unit configured to change said determined scheduling priority in dependence on a difference between said average preceding value and a minimum average value allocated to said user;
    wherein priority determination unit and priority change unit are configured to schedule data packets in time-shared channels, and
    wherein said priority change unit comprises a mapping unit configured to map said average preceding value to a reduced value based on said difference between said average preceding value and said allocated minimum average value.

11. A scheduling apparatus according to claim 10, further comprising disabling unit configured to disable said priority change means.

12. A scheduling apparatus according to claim 11, wherein said disabling unit comprises a switching unit configured to bypass said priority change means.

13. A scheduling apparatus according to claim 10, wherein said scheduling apparatus is provided in a MAC-hs unit of a Node B device.

14. An apparatus comprising:
    priority determination means for determining a scheduling priority for a user based on a ratio between a transmission parameter offered to said user and an average preceding value of said transmission parameter provided to said user within a predetermined time period; and
    priority change means for changing said determined scheduling priority in dependence on a difference between said average preceding value and a minimum average value allocated to said user;

wherein priority determination means and priority change means are configured to schedule data packets in time-shared channels, wherein said priority change means comprises mapping means for mapping said average preceding value to a reduced value based on said difference between said average preceding value and said allocated minimum average value.

15. A scheduling system, comprising:

priority determination unit configured to determine a scheduling priority for a user based on a ratio between a transmission parameter offered to said user and an average preceding value of said transmission parameter provided to said user within a predetermined time period; and priority change unit configured to change said determined scheduling priority in dependence on a difference between said average preceding value and a minimum average value allocated to said user, wherein said priority change unit comprises mapping unit configured to map said average preceding value to a reduced value based on said difference between said average preceding value and said allocated minimum average value.

* * * * *